United States Patent Office 3,056,754
Patented Oct. 2, 1962

3,056,754
VULCANIZABLE COMPOSITION COMPRISING RUBBER AND A RESINOUS COMPLEX REACTION PRODUCT OF A PHENOL-FORMALDEHYDE CONDENSATE AND A METAL CHLORIDE, AND PROCESS FOR VULCANIZING SAME
Arnold Giller, Wiesbaden, Germany, assignor to Chemische Werke Albert, Wiesbaden-Biebrich, Germany, a corporation of Germany
No Drawing. Filed Aug. 18, 1959, Ser. No. 834,397
Claims priority, application Germany Sept. 3, 1958
8 Claims. (Cl. 260—3)

This invention relates to a method of vulcanizing natural and synthetic rubber, using resinous complex compounds formed by alkylphenol resins with metal halides as vulcanizing agents.

Various processes are known whereby natural rubber as well as synthetic elastomers may be cross-linked or vulcanized by reaction with alkylphenol resins. The term "alkylphenol resins" is understood to embrace resins obtained by formaldehyde condensation of phenols under alkaline conditions which have a substituent with at least three carbon atoms attached in the ortho- or para-position, preferably in the para-position. These vulcanization processes have found only limited application because they were either unsatisfactory in their effect or because they exhibited substantial shortcomings.

For example, it is known that natural rubber or butadiene-acrylonitrile rubber can be vulcanized with alkylphenol resins, and that the vulcanizing effect of these resins can be improved by the addition of metal oxides and/or carbon black. This vulcanization process, however, did not acquire practical importance because despite the use of large quantities of resins even extended vulcanization periods produced vulcanizates with unsatisfactory technological properties.

Further, the vulcanization of synthetic rubber of the GR-S type with smaller amounts of alkylphenol dialcohols has been described. While, according to the patent literature, rubber compositions with satisfactory technical properties could be achieved when vulcanization-promoting substances, such as para-formaldehyde or triethanolamine, were simultaneously used, the vulcanization temperatures and periods required therefor, generally 30 to 60 minutes at 195° C., would make it appear to be doubtful whether the vulcanization was actually effected by the 2,6-dimethylol-4-tertiary-butyl-phenol additive, because it has recently been found that synthetic rubber of the type employed can also be vulcanized by purely thermal action, that is without any vulcanizing agents as such [see H. Luttrop, Kautschuk und Gummi, 10, WT 30–38 (1957)].

It is further known that trivalent phenols, such as pyrogallol or phloroglucinol, may be used for the vulcanization of styrene-butadiene copolymerizates, and that this vulcanization can be accelerated by adding aromatic amines, such as aniline or o- or p-nitroso-dimethylaniline, or small amounts of metal chlorides, such as $SnCl_4$, $FeCl_3$ or $AlCl_3$.

In the special case of vulcanization of mixtures of butyl rubber and carbon black, the use of alkylphenol resins, which are obtained by condensation of phenols having alkyl, aryl or aralkyl groups in para-position with formaldehyde, as vulcanizing agents has led to substantially more favorable results because this vulcanization process can be considerably improved by the addition of metal halides. However, the preparation of butyl rubber-carbon black mixtures containing alkylphenol resins and metal halides presents considerable difficulties. Although the alkylphenol resins can be admixed very smoothly with elastomers of all types, the metal halides, such as $FeCl_3 \cdot 6H_2O$ or $SnCl_2 \cdot 2H_2O$, melt when they are worked into butyl rubber on mixing rolls and, depending upon the content of water of crystallization, either form an aqueous film on the roll or increase the stickiness of the mixture to a large degree. If an aqueous film is formed, the rolls no longer grip the elastomer mixture and the initially smooth and uniform sheet may tear or completely fall off the roll. If the elastomer mixture becomes too tacky, it often sticks to the last roll and may then be worked and removed only with tedious effort. An orderly performance of the mixing process is then no longer possible.

Moreover, the free metal halides have a corrosive effect and strongly attack the mixing rolls during the mixing process (see Service Bulletin 100-4, January 1958, Thiokol Chemical Corp.). It has further been found that the physical properties of butyl rubber compositions which have been vulcanized separately with alkylphenol resins and metal halides are to a certain extent dependent upon the mixing procedure used in preparing the mixtures. The sequence and the time intervals in which the phenol resin and the metal halides are incorporated in the mixtures are of some importance.

The use of metal halides free from water of crystallization, such as $ZnCl_2$, does not offer any advantages, because these substances must first be brought into aqueous solution, so that the same difficulties then result as when the metal halides containing water of crystallization are used.

I have now surprisingly found that rubber compositions, and preferably butadiene-styrene compositions and butyl rubber compositions, that is, rubbery copolymers of conjugated diolefins with monoethylenically unsaturated copolymerizable monomers, can be worked into high-quality vulcanizates under conditions customary in the rubber industry if complex resinous products, which are obtained by reaction of alkylphenol resins with metal halides and which are described in greater detail below, are used as vulcanizing agents because the above-mentioned difficulties do not occur upon working the complex compounds into the rubber.

The resinous vulcanizing agents which are employed in accordance with the present invention are, as such, not the subject matter of the invention. They may, for example, be prepared by reacting alkylphenol resins, which are formed in accordance with known methods by condensation under alkaline conditions of p-alkyl-, p-aryl- or p-aralkyl-substituted phenols with formaldehyde, with those metal halides which are capable of forming ansolvo-acids, preferably $SnCl_2 \cdot 2H_2O$ and $FeCl_2 \cdot aq$, under mild conditions.

While the alkylphenol resins may also be reacted with metal bromides to form complex compounds, those formed with metal chlorides are technically of primary importance.

The reaction products are complex compounds which distinctly differ in their properties from simple mechanical mixtures of alkylphenol resins and metal halides. For instance, the complex resin obtained from a p-diisobutyl substituted alkylphenol resin and stannous chloride is, in contrast to a corresponding simple mixture, clear and transparent and forms a clear solution in benzene hydrocarbons and in certain quantities of aliphatic hydrocarbons. Upon reaction of ferrous or ferric chloride with an alkylphenol resin the formation of a complex compound may clearly be recognized, without any further chemical proof, by a deepening of the color of the reaction mixture.

The reaction of the alkylphenol resin with the metal halide may be regarded partially or exclusively as an ester formation between a more or less high-molecular weight, para-substituted phenol-dialcohol, as described by K. Hultzsh in "Chemie der Phenolharze" on page 165, and a metal chloride-hydroxoacid, i.e. ansolvo-acid [see Meerwein, Liebigs Annalen der Chemie, 455 (1927), 227 to 253]. Thus, the chlorides of tin, iron, zinc and aluminum are able to form ansolvo-acids. The ansolvo-acid esters thus formed are believed to have the following structural formula:

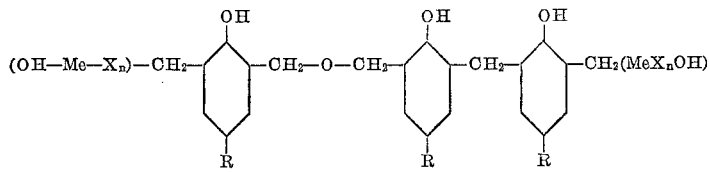

wherein $n$ is an integer from 1 to 4, inclusive, and preferably 2,
R is an alkyl, aryl or aralkyl group, such as p-tertiary butyl, p-diisobutyl, p-phenyl or p-benzyl,
X is a halogen, preferably chlorine, and
Me is a metal.

The amounts of alkylphenol resins and metal halides which are preferably reacted with each other to form satisfactory vulcanizing agents in accordance with the present invention are about 10 parts by weight alkylphenol resin per about 1–10 parts by weight metal halide. The reaction products obtained thereby are, for the sake of convenience and simplicity, hereinafter referred to as "reinforced" alkylphenol resins. Illustrative examples of their preparation are the following:

RESIN A 206 gm. p-octyl-phenol were dissolved at a temperature of 80 to 90° C. in 400 gm. of a 10% aqueous sodium hydroxide solution. After cooling to 60° C., 45 to 60 gm. of an aqueous 30% formaldehyde solution were added, and the reaction mixture was condensed at 60 to 70° C. until all of the formaldehyde had entered into the addition reaction, which took about 3 to 4 hours. After cooling, the reaction mixture was neutralized with dilute sulfuric acid, and the oily condensation product which separated out was washed with water until free from sulfates. The syrup thus obtained, which was now free from salts and acids, was dehydrated at 80° C. in a vacuum and was then transformed into a solid resin by further heating to 150° C. under atmospheric pressure. 180 gm. of this resin were dissolved in 30 gm. acetone by heating to 50° C., and the solution thus obtained was admixed with a solution of 60 gm. $SnCl_2 \cdot 2H_2O$ in 30 gm. acetone. While thoroughly stirring it, the viscous resin solution was heated for 30 minutes at 80° C., whereby the major amount of the acetone solvent evaporated. A caramel-colored, homogeneous resin was obtained, which was freed from adhering acetone by drying it at 40° C. in a forced-air drying chamber.

RESIN B

Its production procedure was the same as for Resin A, except that only 40 gm. $SnCl_2 \cdot 2H_2O$ were used.

RESIN C 50 gm. of a p-tertiary butyl-phenol-formaldehyde resin, known under the trade name of "Alresen 142R," were dissolved in about 50 ml. alcohol, and the resulting solution was admixed with a solution of 16.7 gm. $FeCl_2 \cdot 4H_2O$ in 50 ml. alcohol. A bluish-violet solution was obtained, from which a bluish-gray resin was isolated by careful evaporation in vacuo.

The reinforced alkylphenol resins, in comparison with normal alkylphenol resins, are marked by a substantially increased reactivity. With unsaturated oils, for example with wood oil, they form solid, insoluble masses at temperatures as low as 160° C. They may be worked into elastomer mixtures effortlessly and without noticeable corrosive effect in accordance with known procedures. They do not contain any or at most merely traces of water of crystallization, are readily accepted by the elastomers and produce vulcanizates with readily reproduceable properties. The rate of vulcanization of the reinforced alkylphenol resins is so high that natural and synthetic rubber compositions may be vulcanized therewith under conditions which are usually applied to elastomer compositions modified with sulfur and accelerators, for example 15 to 45 minutes in a press at 143 to 154° C.

The use of the reinforced alkylphenol resins as vulcanizing agents therefore represents a substantial advance over the use of ordinary alkylphenol resins, which vulcanize only very slowly, and over the use of mixtures of alkylphenol resins with metal halides because their incorporation into elastomers is connected with considerable difficulties.

In the vulcanization of natural and synthetic rubber with reinforced alkylphenol resins the concurrent use of other additives which accelerate the vulcanization is not necessary as such. However, if special vulcanizing effects are desired, it is readily possible to modify the compositions additionally with metal halides, alkylphenol resins or metal oxides.

The quantity of reinforced alkylphenol resins necessary for vulcanization depends upon the type of rubber and upon the composition of the reinforced alkylphenol resin. In general, however, at least 3 parts by weight reinforced alkylphenol resin per 100 parts by weight rubber are required. Most advantageous are 8 to 20 parts reinforced alkylphenol resin per 100 parts rubber. Still larger amounts may also be used.

The suitability of the reinforced alkylphenol resin for the vulcanization of natural and synthetic rubber is completely surprising. To begin with, it could not have been expected that metal halides which are capable of forming ansolvo-acids would react with alkylphenol resins to form stable complex compounds, because it is well known that, due to their acid character, the ansolvo-acids have a condensing effect on resols and considerably accelerate the transformation of resols into resinates even in small quantities. Furthermore, it could reasonably have been expected that if the alkylphenol resols formed a complex with a metal halide the terminal methylol groups of the alkylphenol resin would, for practical purposes, be completely blocked and that the metal halide would thus lose its original character and would no longer act as a vulcanization promoter.

The vulcanized compositions produced with the aid of reinforced alkylphenol resins in accordance with the present invention exhibit excellent properties from the view point of rubber technology and may be employed for the manufacture of inner tubes, tires, industrial rubber goods and the like, as illustrated by the following examples. The quantities of ingredients are given in parts by weight.

*Example 1*

Vulcanizable synthetic rubber Compositions I and II were compounded from the following ingredients:

|  | Composition I, parts | Composition II, parts |
|---|---|---|
| Butadiene-styrene synthetic rubber copolymerizate "Plioflex 1500" (for specifications see "Products, Profits and Plioflex," April 1958, published by Goodyear Tire and Rubber Company, Akron, Ohio) | 100.0 | 100.0 |
| Stearic acid | 1.0 | 1.0 |
| Carbon black | 50.0 | 50.0 |
| Mineral oil | 2.0 | 2.0 |
| Resin A | 12.0 | 15.0 |

The synthetic rubber polymerizate was placed on mixing rolls, and when a continuous sheet was formed the mineral oil, the resin and the stearic acid were consecutively added and worked in. Thereafter, the carbon black was added, the batch was homogenized by periodically cutting the sheet on the roll to bring fresh material through the bite. The following table shows the physical characteristics of the vulcanized synthetic rubber compositions after varying periods of vulcanization at a temperature of 154° C.

|  | Composition I | | | Composition II | | |
|---|---|---|---|---|---|---|
| Vulcanization Temperature | 154° C | | | 154° C | | |
| Vulcanization time (minutes) | 15 | 30 | 45 | 15 | 30 | 45 |
| Tensile strength (kg./cm.²) | 213 | 227 | 227 | 211 | 228 | 213 |
| Ultimate elongation (percent) | 527 | 510 | 482 | 371 | 352 | 330 |
| Modulus at 150% elongation (kg./cm.²) | 35 | 39 | 43 | 57 | 68 | 74 |
| Modulus at 300% elongation (kg./cm.²) | 101 | 109 | 123 | 158 | 185 | 190 |
| Tear-resistance by slit test (kg./cm.²) | 28 | 23 | 23 | 24 | 23 | 22 |
| Hardness Shore A (degrees) | 62 | 63 | 64 | 66 | 69 | 70 |
| Rebound elasticity (percent) | 35 | 35 | 36 | 35 | 35 | 35 |

Example II

A vulcanizable butyl rubber Composition III was compounded from the following ingredients:

| | Parts |
|---|---|
| Butyl rubber "Enjay 365" (for specifications see "Enjay Butyl," published by Enjay Company, Inc., New York, New York) | 100.0 |
| MPC carbon black | 60.0 |
| Stearic acid | 1.0 |
| Resin A | 8.0 |

The butyl rubber was placed on a cold mixing roll and allowed to form a smooth sheet. Thereafter, the stearic acid, half of the carbon black were added consecutively and worked in. Finally, the mixture was homogenized by cutting it several times on the roll and rolling it again each time. The mixing properties and working characteristics of the composition were excellent. No sticking to the rolls or corrosion were observed. The following table shows the physical properties of Composition III after vulcanization at 143 and 150° C. respectively, for varying periods of time.

| Vulcanization temperature | 143° C. | | | 150° C. | | |
|---|---|---|---|---|---|---|
| Vulcanization time (minutes) | 15 | 30 | 45 | 15 | 30 | 45 |
| Tensile strength (kg./cm.²) | 140 | 148 | 143 | 150 | 146 | 144 |
| Ultimate elongation (percent) | 474 | 461 | 438 | 466 | 423 | 386 |
| Modulus at 150% elongation (kg./cm.²) | 29 | 31 | 33 | 33 | 33 | 35 |
| Modulus at 300% elongation (kg./cm.²)² | 78 | 86 | 90 | 86 | 92 | 101 |
| Tear-resistance by slit test kg./cm.²) | 27 | 28 | 24 | 25 | 25 | 21 |
| Hardness Shore A (degrees) | 61 | 63 | 64 | 62 | 64 | 65 |
| Rebound elasticity (percent) | 6 | 6 | 6 | 6 | 6 | 6 |

Thus, Composition III produced a high-quality vulcanizate after vulcanization for only 15 minutes at 143° C.

Example III

Vulcanizable butyl rubber Compositions IV, V and VI were compounded from the following ingredients:

|  | Composition IV, parts | Composition V, parts | Composition VI, parts |
|---|---|---|---|
| Butyl rubber "Enjay 365" | 100.0 | 100.0 | 100.0 |
| MPC channel black | 60.0 | 60.0 | 60.0 |
| Stearic Acid | 1.0 | 1.0 | 1.0 |
| Resin B | 8.0 | 10.0 |  |
| Resin C |  |  | 12.0 |

The compositions were compounded by the procedure described in Example II. Resins B and C were as easy to work into the rubber as Resin A. The compositions did not stick to the rolls and no corrosion was observed. The following table shows the physical properties of the vulcanized butyl rubber compositions after vulcanization at 150° C. for varying periods of time.

|  | Composition IV | | | Composition V | | | Composition VI | | |
|---|---|---|---|---|---|---|---|---|---|
| Vulcanization temperature | 150° C. | | | 150° C. | | | 150° C. | | |
| Vulcanization time (minutes) | 15 | 30 | 45 | 15 | 30 | 45 | 15 | 30 | 45 |
| Tensile strength (kg./cm.²) | 94 | 111 | 121 | 135 | 134 | 136 | 121 | 116 | 125 |
| Ultimate elongation (percent) | 594 | 549 | 532 | 530 | 477 | 434 | 739 | 668 | 662 |
| Modulus at 150 percent elongation (kg./cm.²) | 18 | 23 | 24 | 25 | 29 | 31 | 19 | 15 | 19 |
| Modulus at 300 percent elongation (kg./cm.²) | 41 | 51 | 59 | 66 | 77 | 83 | 35 | 38 | 42 |
| Tear-resistance by slit test (kg./cm.²) | 20 | 21 | 23 | 24 | 24 | 26 | 28 | 23 | 24 |
| Hardness Shore A (degrees) | 56 | 59 | 61 | 60 | 62 | 65 | 60 | 63 | 64 |
| Rebound elasticity (percent) | 6 | 6 | 6 | 6 | 6 | 6 | 6 | 6 | 6 |

Example IV

Vulcanizable butyl rubber Compositions VII and VIII with light-colored reinforcing fillers instead of carbon black were compounded from the following ingredients:

|  | Composition VII, parts | Composition VIII, parts |
|---|---|---|
| Butyl rubber "Enjay 365" | 100.0 | 100.0 |
| Ultrasil VN 3 (pure precipitated silicic acid) | 50.0 | 50.0 |
| Stearic acid | 1.0 | 1.0 |
| Resin A | 10.0 | 12.0 |

The butyl rubber was placed on a cold mixing roll and was milled until a smooth sheet was formed. Thereafter, the stearic acid, half of the Ultrasil VN 3 filler, the resin and the remaining amount of filler were worked in consecutively. Finally, the sheet was homogenized by cutting it several times on the roll and, rolling it again each time. No difficulties were encountered in compounding these vulcanizable compositions. The following table shows the physical properties of the vulcanized butyl rubber Compositions VII and VIII after vulcanization at 150° C. for varying periods of time.

|  | Composition VII | | | Composition VIII | | |
|---|---|---|---|---|---|---|
| Vulcanization Temperature | 150° C. | | | 150° C. | | |
| Vulcanization time (minutes) | 15 | 30 | 45 | 15 | 30 | 45 |
| Tensile strength (kg./cm.$^2$) | 113 | 138 | 141 | 142 | 152 | 148 |
| Ultimate elongation (percent) | 882 | 808 | 736 | 831 | 752 | 712 |
| Modulus at 150% elongation (kg./cm.$^2$) | 17 | 17 | 19 | 17 | 19 | 19 |
| Modulus at 300% elongation (kg./cm.$^2$) | 27 | 33 | 40 | 31 | 40 | 42 |
| Tear-resistance by slit test (kg./cm.$^2$) | 27 | 27 | 25 | 32 | 28 | 33 |
| Hardness, Shore A (degrees) | 56 | 59 | 60 | 55 | 16 | 61 |
| Rebound Elasticity (percent) | 6 | 8 | 8 | 7 | 8 | 8 |

*Example V*

A vulcanizable natural rubber Composition IX was compounded from the following ingredients:

| | Parts |
|---|---|
| Smoked sheets | 100.0 |
| Carbon black | 50.0 |
| Stearic acid | 1.0 |
| Mineral oil | 2.0 |
| Resin A | 15.0 |

The ingredients were compounded as described in Example I. The following table shows the physical properties of vulcanized natural rubber Composition IX after vulcanization at 154° C. for varying periods of time.

| Vulcanization temperature | 154° C. | | |
|---|---|---|---|
| Vulcanization time | 15 | 30 | 45 |
| Tensile strength (kg./cm.$^2$) | 131 | 121 | 123 |
| Ultimate elongation (percent) | 279 | 243 | 238 |
| Modulus at 150% elongation (kg./cm.$^2$) | 52 | 61 | 65 |
| Hardness, Shore A (degrees) | 66 | 69 | 69 |
| Rebound elasticity (a percent) | 35 | 34 | 35 |

Thus, vulcanizates of natural rubber having good hardness, elasticity modulus and elongation characteristics were also obtained with the aid of the reinforced alkylphenol resins according to the invention as vulcanizing agents.

*Example VI*

A vulcanizable butadiene-acrylonitrile rubber Composition X was compounded from the following ingredients:

| | Parts |
|---|---|
| Butadiene-acrylonitrile copolymerisate "Perbunan 3805" (for specifications see prospectus of Farbenfabriken Bayer, dated March 15, 1954) | 100.0 |
| Carbon black | 40.0 |
| Naftolen ZD (mixture of high-molecular, slightly unsaturated, viscous hydrocarbons; for specifications see Kluckow, Praxis der Gummichemiker, 1954, page 142) | 2.0 |
| Plastikator RA (mixture of high-boiling-point hydrocarbons; for specifications see Kluckow, Praxis der Gummichemiker, 1954, page 144) | 3.0 |
| Stearic acid | 2.0 |
| Resin A | 12.0 |

The butadiene-acrylonitrile copolymerisate was placed on a mixing roll and allowed to form a smooth sheet. Thereafter, a half of the carbon black, the stearic acid, the Naftolen, the plasticizer, the Resin A and the remaining amount of carbon black were consecutively worked in. The following table shows the physical properties of the vulcanized butadiene-acrylonitrile rubber Composition X after vulcanization at 143 and 154° C. for varying periods of time:

| Vulcanization temperature | 143° C. | | | 154° C. | | |
|---|---|---|---|---|---|---|
| Vulcanization time (minutes) | 15 | 30 | 45 | 15 | 30 | 45 |
| Tensile strength (kg./cm.$^2$) | 130 | 136 | 144 | 127 | 151 | 150 |
| Ultimate elongation (percent) | 850 | 776 | 710 | 747 | 732 | 721 |
| Modulus at 300% elongation (kg./cm.$^2$) | 27 | 31 | 35 | 31 | 38 | 40 |
| Modulus at 500% elongation (kg./cm.$^2$) | 60 | 71 | 79 | 69 | 83 | 88 |
| Tear-resistance by slit test (kg./cm.$^2$) | 26 | 25 | 24 | 25 | 28 | 24 |
| Hardness, Shore A (degrees) | 46 | 47 | 48 | 47 | 48 | 49 |
| Rebound elasticity (percent) | 10 | 10 | 10 | 10 | 10 | 10 |

While the present invention has been illustrated with the aid of specific examples, it will be readily apparent to those skilled in the art that the invention is not limited to these examples and that various changes and modifications may be made without departing from the spirit of the invention or the scope of the appended claims.

I claim:

1. In a process of vulcanizing elastomer compositions of rubbers selected from the group consisting of natural rubber and rubbery copolymers of conjugated diolefins with monoethylenically unsaturated copolymerizable monomers, the improvement which comprises incorporating into said elastomer compositions as a sole vulcanizing agent a resinous complex reaction product formed from (1) a condensation product of formaldehyde with a phenol substituted by a hydrocarbon radical selected from the group consisting of alkyl, aryl and aralkyl, and (2) an ansolvo-acid-forming metal chloride selected from the group consisting of the chlorides of tin, iron, zinc and aluminum.

2. In a process of vulcanizing elastomer compositions of rubbers selected from the group consisting of natural rubber and rubbery copolymers of conjugated diolefins with monoethylenically unsaturated copolymerizable monomers, the improvement which comprises incorporating into said elastomer compositions as a sole vulcanizing agent a resinous complex reaction product formed from (1) about 10 parts by weight of a condensation product of formaldehyde with a phenol substituted by a hydrocarbon radical selected from the group consisting of alkyl, aryl and aralkyl, and (2) about 1 to 10 parts by weight of an ansolvo-acid-forming metal chloride selected from the group consisting of the chlorides of tin, iron, zinc and aluminum.

3. In a process of vulcanizing elastomer compositions of rubbers selected from the group consisting of natural rubber and rubbery copolymers of conjugated diolefins with monoethylenically unsaturated copolymerizable monomers, the improvement which comprises incorporating into said elastomer compositions as a sole vulcanizing agent a resinous complex reaction product formed by about (1) 10 parts by weight of a condensation product of formaldehyde with a phenol substituted by a hydrocarbon radical selected from the group consisting of alkyl, aryl and aralkyl, and (2) about 1 to 10 parts by weight of a tin chloride.

4. In a process of vulcanizing elastomer compositions of rubbers selected from the group consisting of natural rubber and rubbery copolymers of conjugated diolefins with monoethylenically unsaturated copolymerizable monomers, the improvement which comprises incorporating into said elastomer compositions as a sole vulcanizing agent a resinous complex reaction product formed by about (1) 10 parts by weight of a condensation product of formaldehyde with a phenol substituted by a hydrocarbon radical selected from the group consisting of alkyl, aryl and aralkyl, and (2) about 1 to 10 parts by weight of an iron chloride.

5. A vulcanizable elastomer composition consisting essentially of a rubber base material selected from the group consisting of natural rubber and rubbery copolymers of conjugated diolefins with monoethylenically unsaturated copolymerizable monomers, a filler, a plasticizer, and as a sole vulcanizing agent a resinous complex reaction product formed from (1) a condensation product of formaldehyde with a phenol substituted by a hydrocarbon radical selected from the group consisting of alkyl, aryl and aralkyl, and (2) an ansolvo-acid-forming metal chloride, selected from the group consisting of the chlorides of tin, iron, zinc and aluminum.

6. A vulcanizable elastomer composition consisting essentially of a rubber base material selected from the group consisting of natural rubber and rubbery copolymers of conjugated diolefins with monoethylenically unsaturated copolymerizable monomers, a filler, a plasticizer, and as a sole vulcanizing agent a resinous complex reaction product formed by about (1) 10 parts by weight of a condensation product of formaldehyde with a phenol substituted by a hydrocarbon radical selected from the group consisting of alkyl, aryl and aralkyl, and (2) about 1 to 10 parts by weight of a metal chloride capable of forming an ansolvo-acid selected from the group consisting of the chlorides of tin, iron, zinc and aluminum, the weight ratio of vulcanizing agent to rubber base material being 1 to 10 parts of vulcanizing agent to 100 parts rubber base material.

7. A vulcanizable elastomer composition consisting essentially of a rubber base material selected from the group consisting of natural rubber and rubbery copolymers of conjugated diolefins with monoethylenically unsaturated copolymerizable monomers, a filler, a plasticizer, and as a sole vulcanizing agent a resinous complex reaction product formed by about (1) 10 parts by weight of a condensation product of formaldehyde with a phenol substituted by a hydrocarbon radical selected from the group consisting of alkyl, aryl and aralkyl, and (2) about 1 to 10 parts by weight of a tin chloride, the weight ratio of vulcanizing agent to rubber base material being 1 to 10 parts of vulcanizing agent to 100 parts of rubber base material.

8. A vulcanizable elastomer composition consisting essentially of a rubber base material selected from the group consisting of natural rubber and rubbery copolymers of conjugated diolefins with monoethylenically unsaturated copolymerizable monomers, a filler, a plasticizer, and as a sole vulcanizing agent a resinous complex reaction product formed by about (1) 10 parts by weight of a condensation product of formaldehyde with a phenol substituted by a hydrocarbon radical selected from the group consisting of alkyl, aryl and aralkyl, and (2) about 1 to 10 parts by weight of an iron chloride, the weight ratio of vulcanizing agent to rubber base material being 1 to 10 parts of vulcanizing agent to 100 parts of rubber base material.

References Cited in the file of this patent

UNITED STATES PATENTS

| | | |
|---|---|---|
| 1,150,642 | Stockhausen et al. | Aug. 17, 1915 |
| 2,434,129 | Throdahl | Jan. 6, 1948 |
| 2,726,224 | Peterson et al. | Dec. 6, 1955 |

FOREIGN PATENTS

| | | |
|---|---|---|
| 790,803 | Great Britain | Feb. 19, 1958 |